US012586805B2

(12) United States Patent
Li et al.

(10) Patent No.: US 12,586,805 B2
(45) Date of Patent: Mar. 24, 2026

(54) SOLID OXIDE FUEL CELL, SOLID OXIDE FUEL CELL STACK AND MANUFACTURING METHOD OF SOLID OXIDE FUEL CELL

(71) Applicant: TAIYO YUDEN CO., LTD., Tokyo (JP)

(72) Inventors: Xinyu Li, Tokyo (JP); Chie Kawamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 591 days.

(21) Appl. No.: 17/909,667

(22) PCT Filed: Nov. 25, 2020

(86) PCT No.: PCT/JP2020/043718
§ 371 (c)(1),
(2) Date: Sep. 6, 2022

(87) PCT Pub. No.: WO2021/192412
PCT Pub. Date: Sep. 30, 2021

(65) Prior Publication Data
US 2023/0115530 A1      Apr. 13, 2023

(30) Foreign Application Priority Data

Mar. 26, 2020 (JP) ................................. 2020-056383

(51) Int. Cl.
*H01M 8/1213*      (2016.01)
*H01M 4/86*      (2006.01)
*H01M 4/92*      (2006.01)
*H01M 8/0258*      (2016.01)
*H01M 8/12*      (2016.01)

(52) U.S. Cl.
CPC ....... *H01M 8/1213* (2013.01); *H01M 4/8621* (2013.01); *H01M 4/925* (2013.01); *H01M 8/0258* (2013.01); *H01M 2008/1293* (2013.01)

(58) Field of Classification Search
CPC ................................................... H01M 8/1213
See application file for complete search history.

(56) References Cited

U.S. PATENT DOCUMENTS

2007/0166604 A1 7/2007 Katagiri et al. ................ 429/45
2014/0212784 A1 7/2014 Okuyama et al. ............ 429/465
2019/0109333 A1 4/2019 Okui ................... H01M 8/0258

FOREIGN PATENT DOCUMENTS

CN      1971990 A      5/2007
CN      103636044 A      3/2014
(Continued)

OTHER PUBLICATIONS

JP2018133165translation (Year: 2018).*
(Continued)

*Primary Examiner* — Brian R Ohara
(74) *Attorney, Agent, or Firm* — Stein IP, LLC

(57) ABSTRACT
The solid oxide fuel cell includes a support of which a main component is a metal, an anode layer that is supported by the support, an electrolyte layer of solid oxide that is provided on the anode layer and has oxygen ion conductivity, a cathode layer that is provided on the electrolyte layer, and a porous layer of a metal that covers the cathode layer and a part of the electrolyte layer around the cathode.

7 Claims, 5 Drawing Sheets

100

(56)         References Cited

FOREIGN PATENT DOCUMENTS

| | | | | |
|---|---|---|---|---|
| JP | 2005-310529 | A | | 11/2005 |
| JP | 2015065151 | A1 | * | 2/2015 |
| JP | 2015-65151 | A | | 4/2015 |
| JP | 2018133165 | A | * | 8/2018 |
| JP | 2019-46708 | A | | 3/2019 |
| WO | WO 2017/175371 | A1 | | 10/2017 |

OTHER PUBLICATIONS

JP2015065151A1description (Year: 2015).*
Peter Blennow et al., "Development of Planar Metal Supported SOFC with Novel Cermet Anode", ECS Transactions, vol. 25, No. 2, No. 2, 2009, pp. 701-710.
Trine Klemensø et al., "High performance metal-supported solid oxide fuel cells with Gd-doped ceria barrier layers", Journal of Power Sources, vol. 196, Issue 22, Nov. 15, 2011, pp. 9459-9466.
International Search Report dated Jan. 19, 2021 issued in PCT Application No. PCT/JP2020/043718.
Written Opinion of the International Searching Authority dated Jan. 19, 2021 issued in PCT Application No. PCT/JP2020/043718.
Written Opinion of the International Searching Authority dated Jan. 19, 2021, issued to the corresponding International Application No. PCT/JP2020/043718.
First Office Action issued on Apr. 17, 2025 in a counterpart Chinese Patent Application No. 202080099043.3.
Second Office Action issued on Jan. 24, 2026, in counterpart Chinese Patent Application No. 202080099043.3.

\* cited by examiner

SOLID OXIDE FUEL CELL, SOLID OXIDE FUEL CELL STACK AND MANUFACTURING METHOD OF SOLID OXIDE FUEL CELL

CROSS-REFERENCE TO RELATED APPLICATIONS

This application is a national stage of International Application No. PCT/JP2020/043718, filed Nov. 25, 2020, which claims the benefit of Japanese Application No. 2020-056383, filed Mar. 26, 2020, in the Japanese Patent Office, the disclosures of which are incorporated herein by reference.

TECHNICAL FIELD

The present invention relates to a solid oxide fuel cell, a solid oxide fuel cell stack and a manufacturing method of the solid oxide fuel cell.

BACKGROUND ART

The solid oxide fuel cell has a structure in which an electrolyte layer of solid oxide is provided between an anode layer and a cathode layer. And hydrogen in the fuel gas and oxide ions supplied from the cathode layer side react in the anode layer to generate electricity. Each of the anode layer, the cathode layer, and the electrolyte layer is made of ceramics and is vulnerable to sudden temperature changes and mechanical impacts.

Therefore, by supporting the solid oxide fuel cell with a conductive support made by sintering metal, a structure called a metal support cell that enables the solid oxide fuel cell to withstand sudden temperature changes and mechanical impacts is proposed. The support in the metal support cell also functions as a current collector on the anode side, and current can be taken out through the support.

On the other hand, since it is difficult to fire a material generally used as a cathode layer in a reductive atmosphere, the cathode layer is formed by firing a ceramic material in an air atmosphere. However, when the firing temperature of the cathode layer is high, the support is oxidized and the conductivity of the support is lowered.

Therefore, a method of suppressing oxidation of the support by firing the cathode layer at a low temperature of 1000° C. or lower in an air atmosphere has been proposed (Non-Patent Documents 1 and 2). However, when the cathode layer is fired at such a low temperature, the cathode layer may be peeled off from the base such as the electrolyte layer.

PRIOR ART DOCUMENT

Non-Patent Document

Non-Patent Document 1: ECS Transactions, 25 (2) 701-710 (2009)
Non-patent Document 2: Journal of Power Sources 196 (2011) 9459-9466

DISCLOSURE OF THE INVENTION

Problems to be Solved by the Invention

The present invention has been made in view of the above problems, and has a purpose to provide a solid oxide fuel cell, a solid oxide fuel cell stack, and a manufacturing method of the solid oxide fuel cell capable of suppressing peeling of the cathode layer.

Means for Solving the Problems

A solid oxide fuel cell of the present invention is characterized by including: a support of which a main component is a metal; an anode layer that is supported by the support; an electrolyte layer of solid oxide that is provided on the anode layer and has oxygen ion conductivity; a cathode layer that is provided on the electrolyte layer; and a porous layer of a metal that covers the cathode layer and a part of the electrolyte layer around the cathode.

In the above-mentioned solid oxide fuel cell, in a cross section of the porous layer, voids of the porous layer may occupy 20% or more of a total area of the voids and the metal.

In the above-mentioned solid oxide fuel cell, the metal of the porous layer may include silver.

In the above-mentioned solid oxide fuel cell, the metal of the porous layer may include at least one of gold, platinum, palladium, or silver-palladium alloy.

In the above-mentioned solid oxide fuel cell, a thickness of the porous layer may be 5 μm or more.

A solid oxide fuel cell stack of the present invention is characterized by including: a first support of which a main component is a metal; a first anode layer that is supported by the first support; a first electrolyte layer of a solid oxide that is provided on the first anode layer and has oxygen ion conductivity; a first cathode layer that is provided on the first electrolyte layer; a first porous layer of a metal that covers the first cathode layer and a part of the first electrolyte layer around the first cathode layer; an interconnector that has a first face connected to the first porous layer and has a second face opposite to the first face; an anode electric collector that is connected to the second face of the interconnector; a second support that is provided on the anode electric collector; a second anode layer that is supported by the second support; a second electrolyte layer of a solid oxide that is provided on the second anode layer and has oxygen ion conductivity; a second cathode layer that is provided on the first electrolyte layer; and a second porous layer of a metal that covers the second cathode layer and a part of the first electrolyte layer around the first cathode layer, wherein the first face of the interconnector has a first recess opened to a side of the first porous layer, wherein the first recess forms a first gas path together with the first porous layer, wherein the second face of the interconnector has a second recess opened to a side of the anode electric collector, and wherein the second recess forms a second gas path together with the anode electric collector.

A manufacturing method of a solid oxide fuel cell of the present invention is characterized by including: making a multilayer body in which a support of which a main component is a metal, an anode layer, and an electrolyte layer of a solid oxide having oxygen ion conductivity are stacked in this order; applying a slurry including conductive ceramics powder, on the electrolyte layer; forming a cathode layer by firing the slurry at a temperature of 1000° C. or less in an oxidizing atmosphere; applying a paste including an organic substance and a metal powder so as to cover the cathode layer and a part of the electrolyte layer around the cathode; forming a metal porous layer by firing the paste and desorbing the organic substance.

Effects of the Invention

According to the present invention, it is possible to suppress peeling of a cathode layer.

BEST MODES FOR CARRYING OUT THE INVENTION

Hereinafter, an embodiment will be described with reference to the accompanying drawings.

First Embodiment

Figure 1:
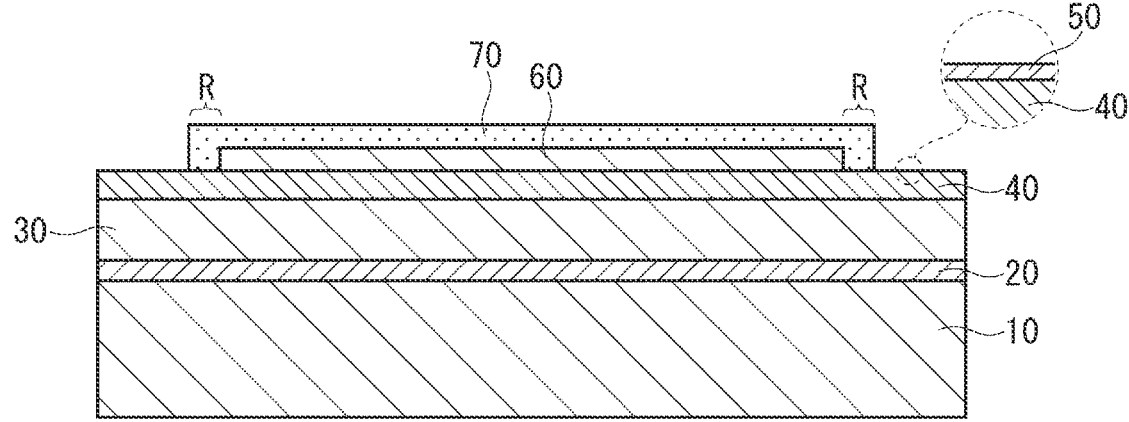
FIG. 1 is a schematic cross-sectional view of a stacking structure of a solid oxide fuel cell in accordance with a first embodiment.

FIG. 1 is a schematic cross-sectional view of a stacking structure of a solid oxide fuel cell 100 in accordance with a first embodiment. As illustrated in FIG. 1, the fuel cell 100 has, as an example, a structure in which a mixed layer 20, an anode layer 30, an electrolyte layer 40, a cathode layer 60, and a porous layer 70 are stacked on a support 10 in this order. A plurality of the fuel cells 100 may be stacked to structure a fuel cell stack.

The electrolyte layer 40 is a dense layer that is mainly composed of solid oxide having oxygen ion conductivity and has gas impermeability. The electrolyte layer 40 is preferably mainly composed of scandia yttria stabilized zirconium oxide (ScYSZ). The oxygen ion conductivity is the highest when the concentration of $Y_2O_3+Sc_2O_3$ is 6 mol % to 15 mol %. Thus, use of a material having this composition is preferable. The thickness of the electrolyte layer 40 is preferably 20 μm or less, further preferably 10 μm or less. The thinner electrolyte layer is better. However, to prevent gas at the upper face side and gas at the lower face side from leaking, the thickness is preferably 1 μm or greater.

The cathode layer 60 is an electrode having electrode activity as a cathode, and has electron conductivity and oxygen ion conductivity. For example, the cathode 60 is lanthanum strontium cobaltite (LCS) having electron conductivity and oxygen ion conductivity. LSC is $LaCoO_3$ doped with strontium (Sr).

A reaction prevention layer 50 is provided on an upper face of the electrolyte layer 40. The reaction prevention layer 50 is mainly composed of a component that prevents reaction between the electrolyte layer 40 and the cathode 60. For example, the reaction prevention layer 50 is mainly composed of Gd-doped ceria (GDC) that is $CeO2$ doped with gadolinium (Gd). As an example, when the electrolyte layer 40 contains ScYSZ and the cathode 60 contains LSC, the reaction prevention layer 50 prevents the following reactions.

$$Sr+ZrO_2 \rightarrow SrZrO_3$$

$$La+ZrO_3 \rightarrow La_2Zr_2O_7$$

The porous layer 70 is a silver porous layer that prevents the cathode layer 60 from peeling off from a base. In the embodiment, the porous layer 70 is formed so as to cover the cathode layer 60 and the electrolyte layer 40 in the region R around the cathode layer 60. According to this structure, since the porous layer 70 adheres to the electrolyte layer 40 via the reaction prevention layer 50 in the region R, the cathode layer 60 is pressed against the porous layer 70 from above and it is possible to suppress the peeling of the cathode layer 60 from the electrolyte layer 40. Further, since oxygen flows through the plurality of voids contained in the porous layer 70, oxygen can be supplied to the cathode layer 60 via the porous layer 70. In particular, silver contained in the porous layer 70 has good adhesion to ceramics among metals, and is therefore effective in suppressing peeling of the cathode layer 60. The material of the porous layer 70 is not limited to silver as long as it is a metal. The porous layer 70 may be formed of any metal of gold, platinum, palladium, and a silver-palladium alloy. These metals are preferable because these metals can be sintered in a normal atmosphere and have preferable conductivity.

The thickness of the porous layer 70 is preferably 5 μm or more, more preferably 10 μm or more, and further preferably 20 μm or more. The reason why the thickness of the porous layer 70 is 5 μm or more is that when the thickness is thinner than 5 μm, the force of the porous layer 70 to press the cathode layer 60 against the electrolyte layer 40 becomes weak, and the cathode layer 60 may be peeled off from the electrolyte layer 40. On the other hand, when the thickness of the porous layer 70 is 5 μm or more, the cathode layer 60 is sufficiently pressed against the electrolyte layer 40 by the porous layer 70, and the porous layer 70 can be prevented from peeling off from the electrolyte layer 40.

On the other hand, the thickness of the porous layer 70 is preferably 100 μm or less, more preferably 70 μm or less, and further preferably 50 μm or less. The reason why the upper limit is set to 100 μm or less is that when the porous layer 70 is made thicker than this, the oxygen gas diffusion resistance on the cathode side increases and the characteristics deteriorate.

Figure 2:
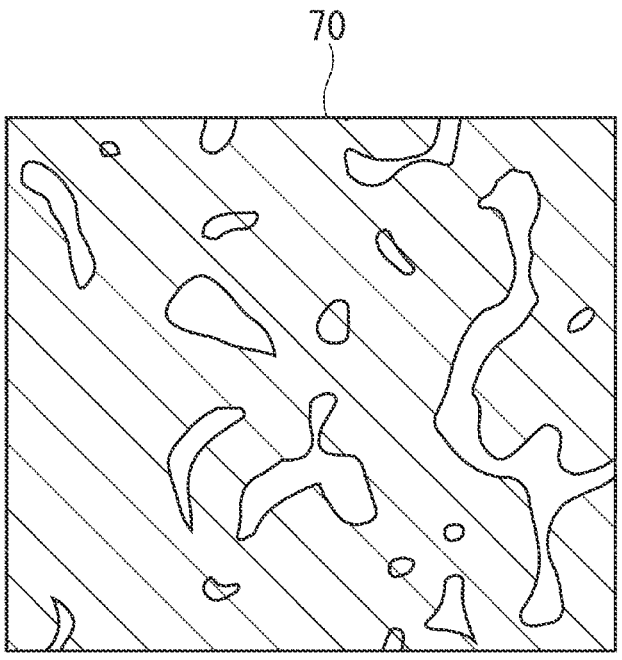
FIG. 2 is a diagram drawn based on a SEM (Scanning Electron Microscope) image of a cross section of a porous layer.

FIG. 2 is a diagram drawn based on a SEM (Scanning Electron Microscope) image of a cross section of the porous layer 70. As illustrated in FIG. 2, a large number of voids are formed in the porous layer 70. When the voids are too small, it becomes difficult for oxygen to flow through the voids and it becomes difficult to supply oxygen to the cathode layer 60. In order to efficiently supply oxygen to the cathode layer 60, it is preferable that the voids occupy 20% or more of the total S of the areas of the voids and silver appearing in the cross section of the porous layer 70. Further, by allowing the voids to occupy an area of 30% or more, more preferably 40% of the total S, oxygen can be easily supplied to the cathode layer 60, and the power generation efficiency of the fuel cell 100 can be improved. The ratio of the area of the void in the total S of the areas of the void and silver is hereinafter referred to as a porosity. The porosity is determined by taking five or more photographs at a magnification that allows the thickness of the entire porous layer 70 to be confirmed based on the sample cross-sectional SEM image (for example, FIG. 2), and calculating an average of a ratio of the area of the voids and the total area estimated from the photographs.

Further, the ratio of the area occupied by the voids to the total S of the areas of the voids and silver appearing in the cross section of the porous layer 70 is preferably 90% or less, more preferably 80% or less, and further more preferably 70% or less. The reason why the upper limit of the porosity is set to 90% is that when the porosity is larger than this, the strength of the porous layer 70 becomes weak and it becomes difficult to prevent the cathode layer 60 from peeling off.

Figure 3:
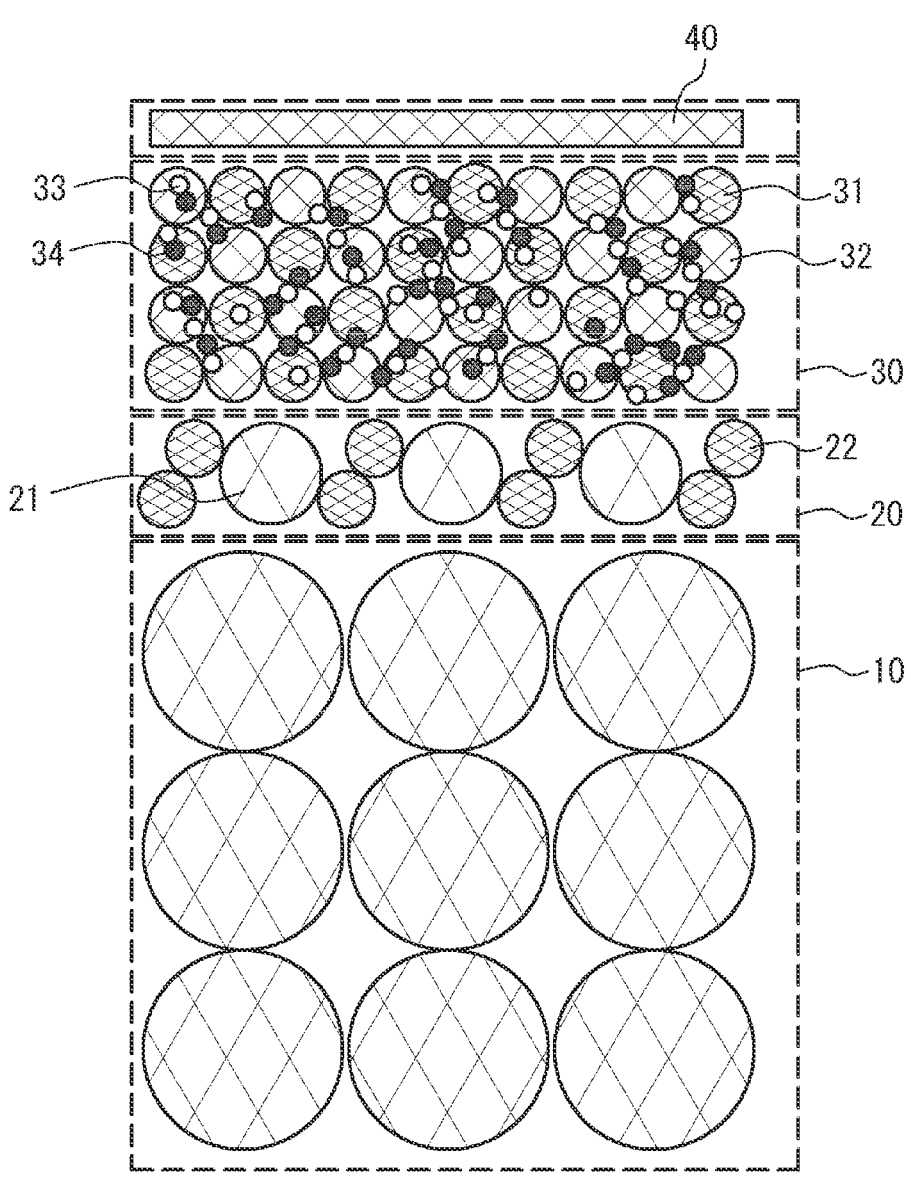
FIG. 3 is an enlarged cross-sectional view illustrating details of a support, a mixed layer, and an anode layer.

FIG. 3 is an enlarged cross-sectional view illustrating details of the support 10, the mixed layer 20, and the anode layer 30. As illustrated in FIG. 3, the support 10 is a member that has gas permeability and is able to support the mixed layer 20, the anode layer 30, the electrolyte layer 40, the reaction prevention layer 50, and the cathode 60. The support 10 is a porous metallic material, and is, for example, a porous material of Fe—Cr alloys.

The anode 30 is an electrode having electrode activity as an anode, and has an electrode bone structure made of a ceramic material. The electrode bone structure contains no metallic component. In this configuration, decrease in the porosity in the anode due to coarsening of a metallic component is inhibited during firing in a high-temperature reductive atmosphere. Additionally, alloying with a metallic component of the support 10 is inhibited, and deterioration of the catalyst function is inhibited.

The electrode bone structure of the anode layer 30 preferably has electron conductivity and oxygen ion conductivity. The anode layer 30 preferably contains a first oxide 31 as an electron conductive material. The first oxide 31 can be a perovskite-type oxide expressed by the composition formula of $ABO_3$ where the A site is at least one selected from a group consisting of Ca, Sr, Ba, and La, and the B site includes at least Cr. The perovskite-type oxide has favorable electron conductivity. The mole fraction of the B site may be equal to or greater than the mole fraction of the A site ($B \geq A$). More specifically, the first oxide 31 can be a $LaCrO_3$-based material.

The electrode bone structure of the anode layer 30 preferably contains a second oxide 32 as an oxygen ion conductive material. The second oxide 32 is ScYSZ or the like. For example, it is preferable to use ScYSZ having the following composition range. Scandia ($Sc_2O_3$) is 5 mol % to 16 mol %, and yttria ($Y_2O_3$) is 1 mol % to 3 mol %. It is more preferable to use ScYSZ of which the total additive amount of scandia and yttria is 6 mol % to 15 mol %. This is because the highest oxygen ion conductivity is obtained in this composition range. The oxygen ion conductive material is, for example, a material with a transference number of oxygen ion of 99% or greater. GDC may be used as the second oxide 32. In the example of FIG. 3, a solid oxide identical to the solid oxide contained in the electrolyte layer 40 is used as the second oxide 32.

As illustrated in FIG. 3, in the anode layer 30, for example, the first oxide 31 and the second oxide 32 form the electrode bone structure. This electrode bone structure forms a plurality of pores. A catalyst is carried on the surface exposed to the pore of the electrode bone structure. Thus, in the spatially continuously formed electrode bone structure, a plurality of catalysts is spatially dispersed. A composite catalyst is preferably used as the catalyst. For example, a third oxide 33 having oxygen ion conductivity and a catalyst metal 34 are preferably carried, as a composite catalyst, on the surface of the electrode bone structure. The third oxide 33 may be, for example, $BaCe_{1-x}Zr_xO_3$ doped with Y (BCZY, x=0 to 1), $SrCe_{1-x}Zr_xO_3$ doped with Y (SCZY, x=0 to 1), $LaScO_3$ doped with Sr (LSS), or GDC. Ni or the like may be used as the catalyst metal 34. The third oxide 33 may have a composition identical to that of the second oxide 32, or may have a composition different from that of the second oxide 32. A metal acting as the catalyst metal 34 may be in a form of compound when electric power is not generated. For example, Ni may be in a form of a nickel oxide (NiO). These compounds are reduced with a reductive fuel gas supplied to the anode 30, and becomes in a form of metal acting as an anode catalyst.

The mixed layer 20 contains a metallic material 21 and a ceramic material 22. In the mixed layer 20, the metallic material 21 and the ceramic material 22 are randomly mixed. Thus, a structure in which a layer of the metallic material 21 and a layer of the ceramic material 22 are stacked is not formed. Also in the mixed layer 20, a plurality of pores is formed. The metallic material 21 is not particularly limited as long as the metallic material 21 is a metal. In the example of FIG. 3, a metallic material identical to the metallic material of the support 10 is used as the metallic material 21. The first oxide 31 or the second oxide 32 can be used as the ceramic material 22. For example, ScYSZ, GDC, a $SrTiO_3$-based material, or a $LaCrO_3$-based material can be used as the ceramic material 22. Since the $SrTiO_3$-based material and the $LaCrO_3$-based material have high electron conductivity, the ohmic resistance in the mixed layer 20 can be reduced.

The fuel cell 100 generates power by the following actions. An oxidant gas containing oxygen, such as air, is supplied to the cathode layer 60. At the cathode layer 60, oxygen reaching the cathode layer 60 reacts with electrons supplied from an external electric circuit to become oxygen ions. The oxygen ions conduct through the electrolyte layer 40 to move to the anode layer 30 side. On the other hand, a fuel gas containing hydrogen, such as a hydrogen gas or a reformed gas, is supplied to the support 10. The fuel gas reaches the anode layer 30 through the support 10 and the mixed layer 20. Hydrogen reaching the anode layer 30 release electrons at the anode layer 30 and reacts with oxygen ions conducting through the electrolyte layer 40 from the cathode layer 60 side to become water ($H_2O$). The released electrons are drawn out to the outside by the external electric circuit. The electrons drawn out to the outside are supplied to the cathode layer 60 after doing electric work. Through the above-described actions, electric power is generated.

In the above-described power generation reaction, the catalyst metal 34 acts as a catalyst in the reaction between hydrogen and oxygen ions. The first oxide 31 conducts electrons obtained by the reaction between hydrogen and oxygen ions. The second oxide 32 conducts oxygen ions reaching the anode 30 from the electrolyte layer 40.

Figure 4:
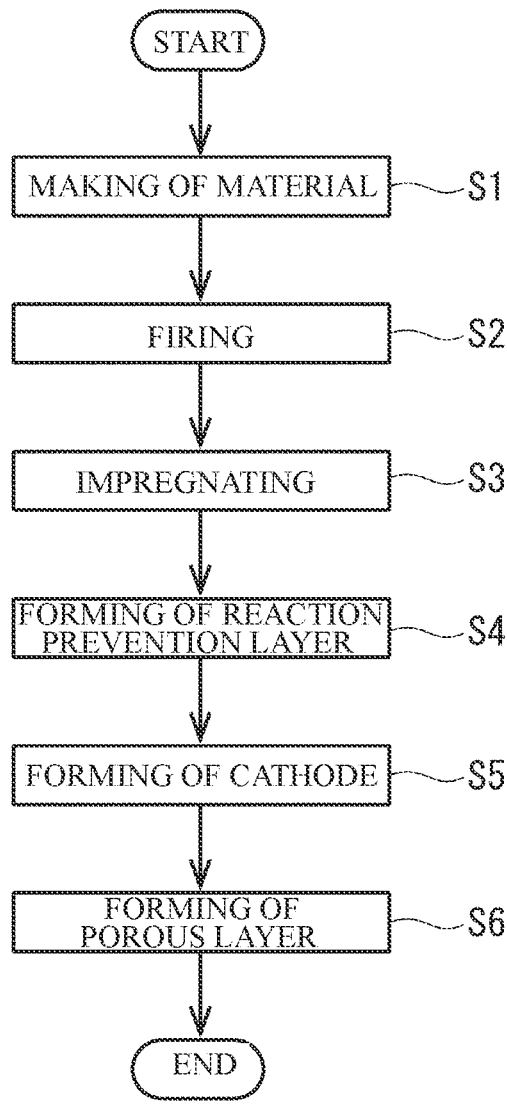
FIG. 4 illustrates a flow of a manufacturing method of a fuel cell.

The fuel cell 100 of the embodiment has the support 10 of which the main component is a metal. Therefore, the fuel cell 100 has resistance against thermal shock, mechanical shock and so on. In the following, a description will be given of a manufacturing method of the fuel cell 100. FIG. 4 illustrates a flow of the manufacturing method of the fuel cell 100.

(Making Process of Material for Support) Metallic powder having a particle size of, for example, 10 μm to 100 μm, a plasticizer, a solvent, a vanishing material, and a binder are mixed to make slurry as a material for support. The amount of the plasticizer is adjusted to, for example, 1 wt % to 6 wt % to adjust the adhesiveness of the sheet. The solvent is toluene, 2-propanol (IPA), I-butanol, terpineol, butyl acetate, ethanol, or the like. The amount of the solvent is 20 wt % to 30 wt % depending on the viscosity or the like. The vanishing material is an organic substance. The binder is PVB, acrylic resin, ethyl cellulose, or the like. The material for support is used as a material for forming the support 10. The ratio of the volume of the organic components (the vanishing material, the solid component of the binder, and the plasticizer) to the volume of the metallic powder is within a range of, for example, 1:1 to 20:1. The amount of the organic components is adjusted depending on the porosity.

(Making Process of Material for Mixed Layer) Ceramic material powder, which is the raw material of the ceramic material 22, metallic material powder having a small particle size, which is the raw material of the metallic material 21, a solvent, a plasticizer, and a binder are mixed to make slurry as a material for mixed layer. The ceramic material powder has a particle size of, for example, 100 nm to 10 μm. The metallic material powder has a particle size of, for example, 1 μm to 10 μm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The vanishing material is an organic substance. The binder is PVB, acrylic resin, ethyl cellulose, or the like. The ratio of the volume of the organic components (the vanishing material, the solid component of the binder, and the plasticizer) to the volume of the ceramic material powder and the metallic material powder is within a range of, for example, 1:1 to 5:1. The amount of the organic components is adjusted depending on the porosity. The diameter of the pore is controlled by adjusting the particle size of the vanishing material. The ceramic material powder may contain powder of an electron conductive material and powder of an oxide-ion conductive material. In this case, the ratio of the volume of the powder of the electron conductive material to the volume of the powder of the oxide-ion conductive material is preferably within a range of, for example, 1:9 to 9:1. Use of an electrolyte material such as ScYSZ, GDC, or the like instead of the electron conductive material also prevents the peeling of the boundary face and enables the manufacture of the cell. However, to reduce the ohmic resistance, it is preferable to mix an electron conductive material and metallic powder.

(Making Process of Material for Anode layer) Ceramic material powder structuring the electrode bone structure, a solvent, a plasticizer, a vanishing material, and a binder are mixed to make slurry as a material for anode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the first oxide 31 and has a particle size of, for example, 100 nm to 10 μm and powder of the oxygen ion conductive material that is the raw material of the second oxide 32 and has a particle size of, for example, 100 nm to 10 μm may be used as the ceramic material powder structuring the electrode bone structure. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3.

(Making Process of Material for Electrolyte Layer) Powder of an oxygen-ion conductive material, a solvent, a plasticizer, and a binder are mixed to make slurry as a material for electrolyte layer. The powder of the oxygen-ion conductive material is, for example, ScYSZ, YSZ, GDC, or the like, and has a particle size of 10 nm to 1000 nm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder and the plasticizer) to the volume of the powder of the oxygen ion conductive material is within a range of, for example, 6:4 to 3:4.

(Making Process of Material for Cathode) Powder of lanthanum strontium cobaltite (LSC:LaSrCoO₃), a solvent, a plasticizer, and a binder are mixed to make slurry as a material for cathode. The solvent is toluene, 2-propanol (IPA), 1-butanol, terpineol, butyl acetate, ethanol, or the like, and the amount of the solvent is 20 wt % to 30 wt % depending on the viscosity. The plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder, the plasticizer) to the volume of LSC powder is within a range of, for example, 6:4 to 1:4.

(Firing Process) A support green sheet is made by applying the material for support on a polyethylene terephthalate (PET) film. A mixed layer green sheet is made by applying the material for mixed layer on another PET film. An anode layer green sheet is made by applying the material for anode layer on yet another PET film. An electrolyte layer green sheet is made by applying the material for electrolyte layer on yet another PET film. For example, several support green sheets, one mixed layer green sheet, one anode layer green sheet, and one electrolyte layer green sheet are stacked in this order, cut into a predetermined size, and fired within a temperature range of approximately 1100° C. to 1300° C. in a reductive atmosphere with an oxygen partial pressure of $10^{-20}$ atm or less. Through the above process, a multilayer body in which the mixed layer 20, the electrode bone structure of the anode layer 30, and the electrolyte layer 40 are stacked on the support 10 in this order is obtained.

(Impregnating Process) Next, the electrode bone structure of the anode layer 30 is impregnated with the raw materials of the third oxide 33 and the catalyst metal 34. For example, the following process is repeated as many times as needed such that Gd-doped ceria or Sc, Y-doped zirconia and Ni are generated when the cell is fired in a reductive atmosphere at a predetermined temperature. Nitrate or chloride of Zr, Y, Sc, Ce, Gd, or Ni is dissolved in water or alcohol (ethanol, 2-propanol, methanol or the like). A half cell is impregnated with the resulting solution, and dried. The resulting half cell is subjected to heat treatment.

(Forming Process of Reaction Preventing Layer) As the reaction prevention layer 50, $Ce_{0.8}Gd_{0.2}O_{2-x}$ is formed so as to have a thickness of 1 μm by, for example, PVD.

(Forming Process of Cathode) Next, slurry of the material for cathode is applied on the reaction prevention layer 50 by screen printing and is then dried. After that, the cathode layer 60 is formed by sintering the slurry at a temperature of 1000° C. or less in an oxidizing atmosphere such as an air atmosphere. From a view point of suppressing oxidizing of the metal in the support 10, it is preferable that the thermal process is performed at a temperature of 900° C. or less. When the thermal process is performed at a temperature of 800° C. or less, the oxidizing of the metal in the support 10 is effectively suppressed.

(Porous Layer Forming Process) Next, on the cathode layer 60, a silver paste in which an organic substance (PVB, acrylic resin, ethyl cellulose, and so on) for forming voids and silver powder are mixed is printed. The silver paste is printed in an area larger than the area of the cathode layer 60 so as to cover the entire cathode layer 60. Then, the silver paste is heat-treated at a temperature of 800° C. in an air atmosphere. By this heat treatment, organic substances are desorbed from the silver paste, and the porous layer 70 having a plurality of voids is formed. By the above steps, the fuel cell 100 can be manufactured. Instead of the silver paste, a paste containing any metal powder of gold, platinum, palladium, or a silver-palladium alloy may be used.

EXAMPLES

The fuel cell 100 according to the above embodiment was manufactured according to the manufacturing method according to the above embodiment. Table 1 summarizes the results of an example 1, an example 2, a comparative example 1, and a comparative example 2.

layer 40. Although the cathode layer 60 was slightly deformed when the fuel cell 100 was generated to generate electricity, it is thought that the cathode layer 60 was not peeled off due to the deformation because the cathode layer 60 was pressed by the porous layer 70 from above.

(Example 2) Similar to the example 1, a LaCoO$_3$ material obtained by doping La$_{0.8}$Sr$_{0.2}$CoO$_3$ with Sr was used as the material for the cathode layer 60. Then, the silver porous layer 70 was formed on the cathode layer 60. By making the area of the porous layer 70 larger than the area of the cathode layer 60, the entire cathode layer 60 was covered with the porous layer 70.

Further, in this embodiment, a metal mesh was placed on the porous layer 70 as a current collector. And the porous layer 70 was pressed against the cathode layer 60 by this current collector. In this state, the fuel cell 100 was set in a jig for power generation. Then, the fuel cell 100 was generated to generate electricity, and the resistance values of each part were separated by impedance measurement. As a result, the ohmic resistance of the cathode layer 60 was 0.25 Ω·cm$^2$, and the reaction resistance of the cathode layer 60 was 0.27 Ω·cm$^2$. These values were the same as in the example 1. Therefore, it was clarified that even when the current collector was not used as in the example 1, the resistance of each part could be reduced to the same extent as when the current collector was used as in the example 2.

Further, when the surface of the fuel cell 100 after power generation was confirmed with an optical microscope, the cathode layer 60 was not seen to be peeled off. Moreover, as a result of observing the cross section by SEM, there was no peeling between the cathode layer 60 and the electrolyte layer 40.

TABLE 1

| | CATHODE LAYER | POROUS LAYER | ELECTRIC COLLECTOR | OHMIC RESISTANCE ($\Omega \cdot cm^2$) | REACTION RESISTANCE ($\Omega \cdot cm^2$) | PEEL AFTER POWER GENERATION |
|---|---|---|---|---|---|---|
| EXAMPLE 1 | LaCoO$_3$ BASED MATERIAL | EXIST | NONE | 0.25 | 0.27 | NONE |
| EXAMPLE 2 | LaCoO$_3$ BASED MATERIAL | EXIST | EXIST | 0.25 | 0.27 | NONE |
| COMPARATIVE EXAMPLE 1 | LaCoO$_3$ BASED MATERIAL | NONE | EXIST | 0.43 | 1.23 | EXIST |
| COMPARATIVE EXAMPLE 2 | LaCoO$_3$ BASED MATERIAL | NONE | NONE | 0.72 | 1.2 | EXIST |

(Example 1) As the material of the cathode layer 60, a LaCoO$_3$ based material obtained by doping La$_{0.8}$Sr$_{0.2}$CoO$_3$ with Sr was used. Then, the silver porous layer 70 was formed on the cathode layer 60. By making the area of the porous layer 70 larger than the area of the cathode layer 60, the entire cathode layer 60 was covered with the porous layer 70. The fuel cell 100 was generated to generate electricity, and the resistance values of each part were separated by impedance measurement. As a result, the ohmic resistance of the cathode layer 60 was 0.25 Ω·cm$^2$, and the reaction resistance of the cathode layer 60 was 0.27 Ω·cm$^2$. The thickness of the porous layer 70 was 20 μm. The ratio of the area occupied by the voids to the total area of the voids and the silver appearing in the cross section of the porous layer 70 was 40%.

Further, when the surface of the fuel cell 100 after power generation was confirmed with an optical microscope, the cathode layer 60 was not seen to be peeled off. Moreover, as a result of observing the cross section by SEM, there was no peeling between the cathode layer 60 and the electrolyte (Comparative Example 1) Similar to the example 1, a LaCoO$_3$ material obtained by doping La$_{0.8}$Sr$_{0.2}$CoO$_3$ with Sr was used as the material for the cathode layer 60. However, unlike the example 1, the porous layer 70 was not formed on the cathode layer 60. Instead of the porous layer 70, a metal mesh was placed on the cathode layer 60 as a current collector, and the cathode layer 60 was pressed against the electrolyte layer 40 by this current collector. In this state, the fuel cell 100 was set in the jig for power generation. Then, the fuel cell 100 was generated to generate electricity, and the resistance values of each part were separated by impedance measurement. As a result, the ohmic resistance of the cathode layer 60 was 0.43 Ω·cm$^2$, and the reaction resistance of the cathode layer 60 was 1.23 Ω·cm$^2$. All of these were larger values than those in the example 1.

Further, when the surface of the fuel cell 100 after power generation was confirmed with an optical microscope, cracks were generated on the surface of the cathode layer 60, and the cracks caused peeling of the cathode layer 60. When the electrolyte layer 40 under the peeled cathode layer 60 was confirmed, it was found that the electrolyte layer 40 was glossy and the adhesion between the electrolyte layer 40 and the cathode layer 60 was poor. Further, as a result of observing the cross section by SEM, it was confirmed that the cathode layer 60 was peeled off from the electrolyte layer 40. It is thought that this was because the cathode layer 60 was not covered with the porous layer 70, so that the cathode layer 60 was peeled off from the electrolyte layer 40 even if the cathode layer 60 was slightly deformed during power generation. Further, it is thought that both the ohmic resistance and the reaction resistance showed very high values as described above due to the peeling of the cathode layer 60.

(Comparative Example 2) Similar to the comparative example 1, as the material of the cathode layer 60, a $LaCoO_3$ material obtained by doping $La_{0.8}Sr_{0.2}CoO_3$ with Sr was used. The porous layer 70 was not formed on the cathode layer 60. Further, unlike the comparative example 1, in this comparative example, 2 the metal mesh of the current collector was not placed on the cathode layer 60. In this state, the fuel cell 100 was set in the jig for power generation, and the fuel cell 100 was generated to generate power. As a result of separating the resistance values of each part during power generation by impedance measurement, the ohmic resistance of the cathode layer 60 was 0.72 $\Omega \cdot cm^2$, and the reaction resistance of the cathode layer 60 was 1.2 $\Omega \cdot cm^2$. All of these are larger values than those in the example 1.

Further, when the surface of the fuel cell 100 after power generation was confirmed with an optical microscope, cracks were generated on the surface of the cathode layer 60, and the cathode layer 60 was peeled off in a wider area. When the electrolyte layer 40 under the cathode layer 60 that had been peeled off was confirmed in the same manner as in the comparative example 2, it was also found that the electrolyte layer 40 was glossy and the adhesion between the electrolyte layer 40 and the cathode layer 60 was poor. Further, as a result of observing the cross section by SEM, it was confirmed that the cathode layer 60 was peeled off from the electrolyte layer 40.

In this comparative example 2, it is thought that since there was no current collector that pressed the cathode layer 60 against the electrolyte layer 40, peeling occurred in such a wide region of the cathode layer 60, which increased the ohmic resistance of the cathode layer 60 as described above.

Table 1 summarizes the results of the above-mentioned the example 1, the example 2, the comparative example 1, and the comparative example 2. As shown in Table 1, in examples 1 and 2 forming the porous layer 70, the cathode layer 60 did not peel off, and as a result, both the ohmic resistance and the reaction resistance became low values.

On the other hand, in the comparative examples 1 and 2 in which the porous layer 70 was not formed, the cathode layer 60 was peeled off, and the ohmic resistance and the reaction resistance became large values as compared with the examples 1 and 2.

(Second embodiment) In this embodiment, a solid oxide fuel cell stack including a plurality of fuel cells will be described.

Figure 5:
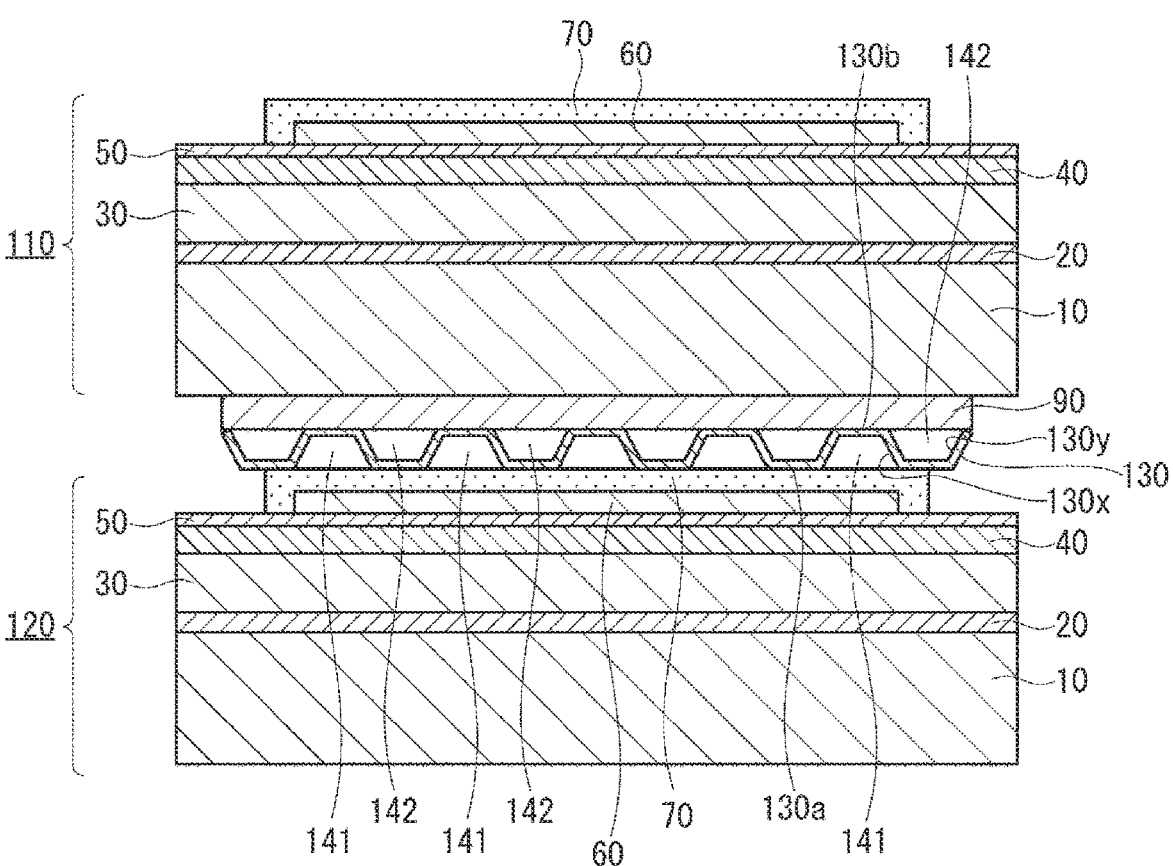
FIG. 5 is a schematic cross-sectional view of a solid oxide fuel cell stack according to a second embodiment.

FIG. 5 is a schematic cross-sectional view of the solid oxide fuel cell stack according to the second embodiment. In FIG. 5, the same elements as described in the first embodiment are designated by the same reference numerals as those in the first embodiment, and the description thereof will be omitted below. As illustrated in FIG. 5, the fuel cell stack 200 has a first fuel cell 110 and a second fuel cell 120. Each of these fuel cells 110 and 120 is a solid oxide type fuel cell and has the same structure as the fuel cell 100 according to the first embodiment.

An interconnect 130 for electrically connecting these fuel cells is provided between the first fuel cell 110 and the second fuel cell 120. The interconnect 130 has a first face 130a connected to the porous layer 70 of the first fuel cell 110. A first recess 130x opened on the porous layer 70 side of the first fuel cell 110 is formed on the first face 130a, and a first flow path 141 is formed by the first recess 130x and the porous layer 70. The first flow path 141 is a flow path through which air flows, and oxygen in the air is supplied to the electrolyte layer 40 of the first fuel cell 110 via the porous layer 70.

Further, the interconnect 130 has a second face 130b facing the first face 130a. The second face 130b is connected to an anode current collector 90, whereby the interconnect 130 is electrically connected to the second fuel cell 120. The anode current collector 90 is, for example, a metal mesh such as nickel bonded to the support 10 of the second fuel cell 120.

Further, a second recess 130y open to the anode current collector 90 side is formed on the second face 130b, and a second flow path 142 is formed by the second recess 130y and the anode current collector 90. The second flow path 142 is a flow path through which a fuel gas containing hydrogen flows, and the hydrogen is supplied to the second fuel cell 120 via the anode current collector 90.

According to such a fuel cell stack 200, since the porous layer 70 is formed in each of the fuel cells 110 and 120 as described in the first embodiment, the cathode layer 60 under the porous layer 70 can be prevented from peeling off from 40.

DESCRIPTION OF LETTERS OR NUMERALS 10 support
20 mixed layer
30 anode layer
40 electrolyte layer
50 reaction prevention layer
60 cathode layer
70 porous layer
100, 110, 120 fuel cell
200 fuel cell stack

The invention claimed is:

1. A solid oxide fuel cell comprising:
a support of which a main component is a metal;
an anode layer that is supported by the support;
an electrolyte layer of solid oxide that is provided on the anode layer and has oxygen ion conductivity;
a cathode layer that is provided on the electrolyte layer; and
a porous layer of a metal that covers the cathode layer and a part of the electrolyte layer around the cathode,
wherein a thickness of the porous layer is 5 μm or more and 70 μm or less, and
wherein the support, the anode layer and the electrolyte layer are integral sintered bodies made by sintering powder materials.

2. The solid oxide fuel cell as claimed in claim 1, wherein, in a cross section of the porous layer, voids of the porous layer occupies 20% or more of a total area of the voids and the metal.

3. The solid oxide fuel cell as claimed in claim 1 wherein the metal of the porous layer includes silver.

4. The solid oxide fuel cell as claimed in claim 1, wherein the metal of the porous layer includes at least one of gold, platinum, palladium, or silver-palladium alloy.

5. The solid oxide fuel cell as claimed in claim 1, wherein a reaction resistance of the cathode layer is 0.27 $\Omega \cdot cm^2$ or less.

6. The solid oxide fuel cell as claimed in claim 1, wherein an ohmic resistance of the cathode layer is 0.25 $\Omega \cdot cm^2$ or less.

7. The solid oxide fuel cell as claimed in claim 1,
wherein a porosity of the porous layer is 20% or more and 40% or less, and
wherein the thickness of the porous layer is 5 μm or more and 20 μm or less.

* * * * *